(12) United States Patent
Zhang

(10) Patent No.: US 9,843,686 B2
(45) Date of Patent: Dec. 12, 2017

(54) METHOD, APPARATUS, AND SYSTEM FOR ALLOCATING PHONE NUMBER

(71) Applicant: Huawei Technologies Co., Ltd., Shenzhen, Guangdong (CN)

(72) Inventor: Hao Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 14/529,460

(22) Filed: Oct. 31, 2014

(65) Prior Publication Data

US 2015/0055512 A1    Feb. 26, 2015

Related U.S. Application Data

(63) Continuation of application No. PCT/CN2013/087467, filed on Nov. 20, 2013.

(30) Foreign Application Priority Data

May 31, 2013  (CN) .......................... 2013 1 0211772

(51) Int. Cl.
*H04L 12/66* (2006.01)
*H04M 7/00* (2006.01)
(Continued)

(52) U.S. Cl.
CPC .......... *H04M 7/0075* (2013.01); *H04L 61/20* (2013.01); *H04L 61/605* (2013.01);
(Continued)

(58) Field of Classification Search
CPC ... H04L 61/20; H04L 61/605; H04L 65/1006; H04L 61/106; H04L 61/1529;
(Continued)

(56) References Cited

U.S. PATENT DOCUMENTS 7,302,255 B1 * 11/2007 Lundy ............... H04L 29/06027
370/338
7,599,358 B2 * 10/2009 Mori ................... H04L 65/1073
370/352
(Continued)

FOREIGN PATENT DOCUMENTS

CN       101047717 A    10/2007
CN       101637031 A     1/2010
(Continued)

OTHER PUBLICATIONS

J. Rosenberg, et al., "SIP: Session Initiation Protocol", Jun. 2002, 270 pages.

*Primary Examiner* — Ricky Ngo
*Assistant Examiner* — Lan Huong Truong

(57) ABSTRACT

A method, an apparatus and a system for allocating a phone number are disclosed. the method includes: receiving, by an SIP server, an automatic number negotiation request packet sent by an IP phone terminal; allocating, by the SIP server, a corresponding IP phone number to the IP phone terminal according to the received automatic number negotiation request packet; and returning, by the SIP server, the allocated IP phone number to the IP phone terminal, so that the IP phone terminal performs a login by using the IP phone number. The method, apparatus and system can improve efficiency and operability of deploying IP phone numbers for a large quantity of IP phone terminals.

12 Claims, 4 Drawing Sheets

(51) Int. Cl.
*H04L 29/06* (2006.01)
*H04M 3/22* (2006.01)
*H04M 3/42* (2006.01)
*H04L 29/12* (2006.01)

(52) U.S. Cl.
CPC ........ *H04L 65/1006* (2013.01); *H04M 3/229* (2013.01); *H04M 3/4228* (2013.01); *H04M 3/42348* (2013.01); *H04L 61/106* (2013.01); *H04L 61/1529* (2013.01)

(58) Field of Classification Search
CPC ........... H04M 7/0075; H04M 3/42348; H04M 3/4228; H04M 3/229
See application file for complete search history.

(56) References Cited

U.S. PATENT DOCUMENTS

| | | | |
|---|---|---|---|
| 2006/0193460 A1 | 8/2006 | Cadiz et al. | |
| 2007/0121561 A1* | 5/2007 | Yashar | H04L 29/06027 370/338 |
| 2007/0274308 A1 | 11/2007 | Kodaka | |
| 2008/0046735 A1* | 2/2008 | Nedeltchev | H04L 63/0823 713/173 |
| 2008/0233935 A1 | 9/2008 | Garg | |
| 2009/0238172 A1* | 9/2009 | Tanizawa | H04L 12/66 370/352 |
| 2012/0128135 A1* | 5/2012 | Sun | H04M 3/08 379/27.01 |
| 2013/0229961 A1* | 9/2013 | Ma | H04W 64/00 370/311 |
| 2014/0161241 A1* | 6/2014 | Baranovsky | H04M 3/51 379/142.05 |
| 2014/0254574 A1* | 9/2014 | Schreuder | H04M 7/0066 370/338 |
| 2014/0376360 A1* | 12/2014 | Lisak | H04L 49/557 370/218 |

FOREIGN PATENT DOCUMENTS

| | | |
|---|---|---|
| CN | 101917526 A | 12/2010 |
| CN | 102014130 A | 4/2011 |
| EP | 2 127 448 A1 | 12/2009 |

* cited by examiner

METHOD, APPARATUS, AND SYSTEM FOR ALLOCATING PHONE NUMBER

CROSS-REFERENCE TO RELATED APPLICATION

This application is a continuation of International Application No. PCT/CN2013/087467, filed on Nov. 20, 2013, which claims priority to Chinese Patent Application No. 201310211772.5, filed on May 31, 2013, both of which are hereby incorporated by reference in their entireties.

TECHNICAL FIELD

The present invention relates to the field of communications, and in particular, to a method, an apparatus, and a system for allocating a phone number.

BACKGROUND

The principle of an IP phone (VoIP for short, Voice over Internet Protocol, also referred to as broadband phone or network phone) is that: an analog signal of a phone is digitalized, and a digital signal is transmitted by using the Internet after being compressed and packaged; after receiving the compressed and packaged signal, a receiving party decompresses the compressed and packaged signal and restores the signal to the analog signal, and receives a voice by using a device, such as a phone.

In the prior art, an IP phone number is deployed in a manner of artificial number allocation and artificial and manual login. An administrator allocates, on a Session Initiation Protocol (SIP) server in advance, an IP phone number to an IP phone terminal of a user, and notifies the user of the IP phone number. After the IP phone terminal is connected to a network, the user needs to manually enter the IP phone number to perform registration, and only after the registration succeeds can the IP phone terminal be used normally. For deployment of a large quantity of IP phones, the administrator needs to manually allocate an IP phone number to each phone, and needs to notify each user corresponding to each IP phone terminal of the IP phone number corresponding to each IP phone terminal; the user completes a login by using the IP phone number that is allocated to a specified terminal. Existing operation steps for deploying an IP phone number are complex, thereby reducing efficiency and operability of deploying IP phone numbers for a large quantity of IP phone terminals.

SUMMARY

The present invention provides a method, an apparatus, and a system for allocating a phone number, which are used to resolve a problem in the prior art that operation steps for allocating an IP phone number are complex, resulting in low efficiency and poor operability when IP phone numbers are deployed for a large quantity of IP phone terminals.

To resolve the foregoing technical problem, a first aspect of embodiments of the present invention provides a method for allocating a phone number, where the method includes:

receiving, by an SIP server, an automatic number negotiation request packet sent by an IP phone terminal;

allocating, by the SIP server, a corresponding IP phone number to the IP phone terminal according to the received automatic number negotiation request packet; and returning, by the SIP server, the allocated IP phone number to the IP phone terminal, so that the IP phone terminal performs a login by using the IP phone number.

In a first possible implementation manner of the first aspect, the allocating, by the SIP server, a corresponding IP phone number to the IP phone terminal according to the received automatic number negotiation request packet includes:

reading, by the SIP server, the received automatic number negotiation request packet, where the automatic number negotiation request packet includes: IP phone terminal identifier information and IP phone terminal authentication information;

authenticating, by the SIP server, the IP phone terminal according to the read IP phone terminal authentication information; and if the authentication succeeds, allocating, by the SIP server according to a preset number allocation algorithm, a corresponding IP phone number to the IP phone terminal corresponding to the IP phone terminal identifier information.

With reference to the first possible implementation manner of the first aspect, in a second possible implementation manner of the first aspect, the preset number allocation algorithm includes one or a combination of multiple of: allocation according to a number segment specified by a user, allocation according to a geographic location of a region in which the IP phone terminal is located, and random allocation.

With reference to the first possible implementation manner of the first aspect, in a third possible implementation manner of the first aspect, after the allocating, by the SIP server according to a preset number allocation algorithm, a corresponding IP phone number to the IP phone terminal corresponding to the IP phone terminal identifier information, the method includes:

establishing, by the SIP server, a mapping relationship between the allocated IP phone number and the IP phone terminal identifier information; and after the returning, by the SIP server, the allocated IP phone number to the IP phone terminal, the method includes:

receiving, by the SIP server, a login request sent by the IP phone terminal, where the login request carries the IP phone number; and if the SIP server verifies that the IP phone number is the IP phone number mapping to the IP phone terminal identifier information of the IP phone terminal, returning, to the IP phone terminal, a response indicating a successful login.

Correspondingly, a second aspect of the embodiments of the present invention further provides a method for allocating a phone number, including:

sending, by an IP phone terminal, an automatic number negotiation request packet to an SIP server;

receiving, by the IP phone terminal, an IP phone number that is allocated by the SIP server to the IP phone terminal according to the automatic number negotiation request packet; and sending, by the IP phone terminal, a login request to the SIP server by using the received IP phone number, to log in to the SIP server.

In a first possible implementation manner of the second aspect, after the receiving, by the IP phone terminal, an IP phone number that is allocated by the SIP server to the IP phone terminal according to the automatic number negotiation request packet, the method includes:

saving, by the IP phone terminal, the received IP phone number into a corresponding IP phone configuration file;

reading, by the IP phone terminal, the IP phone number from the IP phone configuration file; and when the IP phone terminal restarts, sending, by the IP phone terminal, a login request to the SIP server by using the IP phone number read from the IP phone configuration file, to log in to the SIP server.

Correspondingly, a third aspect of the embodiments of the present invention further provides an apparatus for allocating a phone number, including:

a request packet receiving module, configured to receive an automatic number negotiation request packet sent by an IP phone terminal;

a number allocation module, configured to allocate a corresponding IP phone number to the IP phone terminal according to the automatic number negotiation request packet received by the request packet receiving module, and transmit the IP phone number to a number sending module; and the number sending module, configured to receive the IP phone number from the number allocation module, and return the IP phone number to the IP phone terminal, so that the IP phone terminal performs a login by using the IP phone number.

In a first possible implementation manner of the third aspect, the number allocation module includes:

a request packet reading unit, configured to read the automatic number negotiation request packet received by the request packet receiving module, where the automatic number negotiation request packet includes: IP phone terminal identifier information and IP phone terminal authentication information;

an authentication unit, configured to authenticate the IP phone terminal according to the IP phone terminal authentication information read by the request packet reading unit; and a number allocation unit, configured to: when the authentication by the authentication unit succeeds, allocate, according to a preset number allocation algorithm, a corresponding IP phone number to the IP phone terminal corresponding to the IP phone terminal identifier information.

With reference to the first possible implementation manner of the third aspect, in a second possible implementation manner of the third aspect, the preset number allocation algorithm includes one or a combination of multiple of: allocation according to a number segment specified by a user, allocation according to a geographic location of a region in which the IP phone terminal is located, and random allocation.

With reference to the first possible implementation manner of the third aspect, in a third possible implementation manner of the third aspect, the number allocation module further includes:

a mapping unit, configured to establish a mapping relationship between the IP phone number allocated by the number allocation unit and the IP phone terminal identifier information; and the apparatus further includes:

a login request receiving module, configured to receive a login request sent by the IP phone terminal, where the login request carries the IP phone number; and a login verification module, configured to: if verifying that the IP phone number is the IP phone number mapping to the IP phone terminal identifier information of the IP phone terminal, return, to the IP phone terminal, a response indicating a successful login.

Correspondingly, a fourth aspect of the embodiments of the present invention further provides an apparatus for allocating a phone number, wherein the apparatus is a IP phone terminal, including:

a request packet sending module, configured to send an automatic number negotiation request packet to an SIP server;

a number receiving module, configured to receive an IP phone number that is allocated by the SIP server to the IP phone terminal according to the automatic number negotiation request packet sent by the request packet sending module, and transmit the IP phone number to a login module; and the login module, configured to receive the IP phone number from the number receiving module, and send a login request to the SIP server by using the IP phone number, to log in to the SIP server.

In a first possible implementation manner of the fourth aspect, the apparatus further includes:

a saving module, configured to save the IP phone number received by the number receiving module into a corresponding IP phone configuration file; and a read module, configured to read the IP phone number from the IP phone configuration file saved by the saving module; and the login module is further configured to: when the IP phone terminal restarts, send a login request to the SIP server by using the IP phone number read by the read module from the IP phone configuration file, to log in to the SIP server.

Correspondingly, a fifth aspect of the embodiments of the present invention further provides a system for allocating a phone number, including: an IP phone terminal and an SIP server, where the SIP server is the apparatus according to any one of the third aspect, the first possible implementation manner of the third aspect, the second possible implementation manner of the third aspect, and the third possible implementation manner of the third aspect; and the IP phone terminal is the apparatus according to either the fourth aspect or the first possible implementation manner of the fourth aspect.

By using the embodiments of the present invention, an IP phone terminal can perform automatic number negotiation with an SIP server, the SIP server allocates an IP phone number to the IP phone terminal, and the IP phone terminal performs an automatic login by using the IP phone number, thereby implementing automatic deployment of an IP phone number, controlling a cost of phone deployment, and improving efficiency and operability of deploying IP phone numbers for a large quantity of IP phone terminals.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following descriptions merely show some embodiments of the present invention, and a person of ordinary skill in the art can still obtain other drawings according to these accompanying drawings without creative efforts.

DETAILED DESCRIPTION

Figure 1:
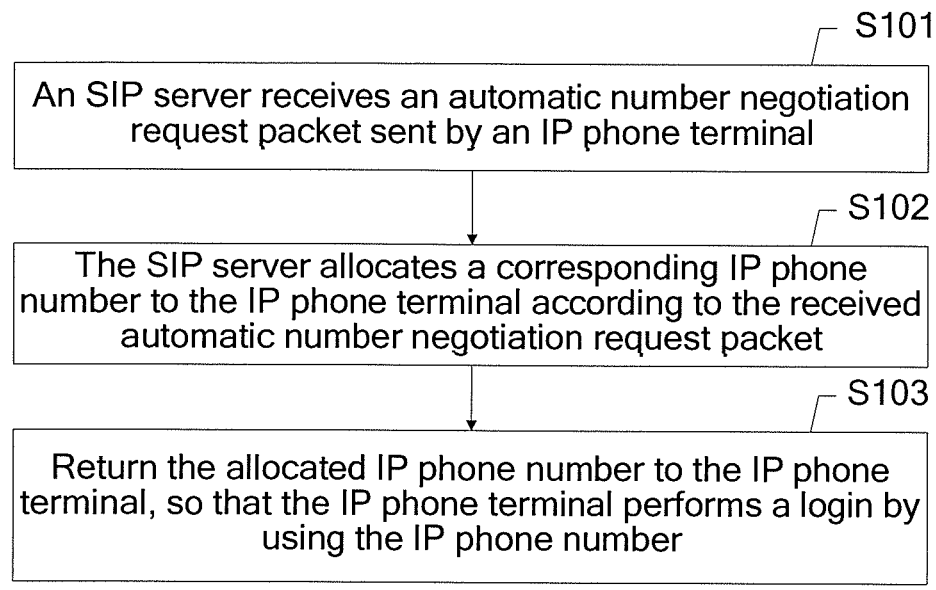
FIG. 1 is a flowchart of a method for allocating a phone number according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a method, an apparatus, and a system for allocating a phone number, where an IP phone terminal sends an automatic number negotiation request packet to an SIP server, the SIP server allocates a corresponding IP phone number to the IP phone terminal according to the received automatic number negotiation request packet, and returns the allocated IP phone number to the IP phone terminal, so that the IP phone terminal performs a login by using the IP phone number. The IP phone terminal can perform automatic number negotiation with the SIP server, the SIP server allocates an IP phone number to the IP phone terminal, and the IP phone terminal performs an automatic login by using the IP phone number. An operation of deploying an IP phone number is simple and convenient, thereby improving efficiency and operability of deploying IP phone numbers for a large quantity of IP phone terminals.

Before the IP phone terminal sends the automatic number negotiation request packet to the SIP server, the IP phone terminal needs to acquire an IP phone configuration file and an IP phone release file. Steps are as follows:

The IP phone terminal is powered on and connected to a network. For example, a controller in the IP phone terminal detects whether to enable 802.1x authentication. If 802.1x authentication is to be enabled, a network access authentication packet is sent to a local area network (LAN), and if the authentication succeeds, the connection to the network succeeds.

The IP phone terminal acquires an IP address of the IP phone terminal and an address of a DNS (Domain Name System, domain name system) server by using the DHCP (Dynamic Host Configuration Protocol, Dynamic Host Configuration Protocol).

The IP phone terminal initiates IP address resolution of a UCEMS (Unified Communications Element Management System, unified communications element management system) to the DNS server according to the acquired address of the DNS server to acquire an address of the UCEMS.

The IP phone terminal initiates, according to the acquired address of the UCEMS, a request for acquiring the IP phone configuration file to the UCEMS.

Further optionally, the IP phone terminal may also initiate a DHCP request to a DHCP server, a DHCP OPTION (optional parameter) in a response message returned by the DHCP server may carry an address of a configuration file. After receiving the response message, the IP phone terminal can directly acquire the configuration file by using the address of the configuration file carried in the DHCP OPTION.

If the IP phone configuration file is acquired and the IP phone configuration file is successfully loaded, the IP phone terminal reads an address of a file server in the IP phone configuration file, and initiates a request for acquiring the IP phone release file to the file server. The file server is capable of managing the entire network in a unified manner, and is capable of providing concurrency control, and security and confidentiality measures for a user of the network to gain access to files and directories. The IP phone configuration file includes feature configuration of the IP phone terminal, and the IP phone configuration file may further include an address of the SIP server.

The IP phone terminal acquires the IP phone release file and successfully updates a release.

After acquiring the IP phone configuration file and the IP phone release file, the IP phone terminal sends the automatic number negotiation request packet to the SIP server, so that the IP phone terminal performs automatic number negotiation with the SIP server, the SIP server allocates an IP phone number to the IP phone terminal, and the IP phone terminal performs an automatic login by using the IP phone number. Specific embodiments are used for description below.

FIG. 1 is a flowchart of a method for allocating a phone number according to an embodiment of the present invention. This embodiment of the present invention may be implemented in an SIP server. As shown in the figure, a procedure in this embodiment includes the following steps:

Step S101: An SIP server receives an automatic number negotiation request packet sent by an IP phone terminal. In a specific implementation, after the IP phone terminal acquires an IP phone configuration file and an IP phone release file, the IP phone terminal detects whether an address of the SIP server exists in the IP phone configuration file, and if the address of the SIP server exists in the IP phone configuration file, the IP phone terminal detects whether an automatic registration procedure is enabled, and if the automatic registration procedure is enabled, the IP phone terminal sends an automatic number negotiation request packet to the SIP server, where the automatic number negotiation request packet carries an automatic number negotiation request identifier, for example, the automatic number negotiation request identifier may be carried by using a From header field, and a specific statement is "From: <sip: Auto_Register@test.com>;tag=469908647". The SIP server identifies the received request packet as an automatic number negotiation request packet according to the automatic number negotiation request identifier.

Step S102: The SIP server allocates a corresponding IP phone number to the IP phone terminal according to the received automatic number negotiation request packet. In a specific implementation, the allocating a corresponding IP phone number to the IP phone terminal according to the received automatic number negotiation request packet may include:

reading, by the SIP server, the received automatic number negotiation request packet, where the automatic number negotiation request packet includes: IP phone terminal identifier information and IP phone terminal authentication information;

authenticating, by the SIP server, the IP phone terminal according to the read IP phone terminal authentication information; and if the authentication succeeds, allocating, by the SIP server according to a preset number allocation algorithm, a corresponding IP phone number to the IP phone terminal corresponding to the IP phone terminal identifier information.

Specifically, the IP phone terminal authentication information includes but is not limited to an authentication certificate, and after reading the IP phone terminal authentication information carried in the automatic number negotiation request packet, the SIP server authenticates the IP phone terminal, and the SIP server exchanges certificates with the IP phone terminal, that is, two-way authentication is performed. In this way, authentication of the IP phone terminal by the SIP server and authentication of the SIP server by the IP phone terminal are completed.

IP phone terminal identifier information is a unique identifier corresponding to each IP phone terminal, which may be a device number, an identifier coded according to geographic region, or the like. When the IP phone terminal is identified, according to the IP phone terminal identifier information, as a device to which no number has been allocated, a quantity of currently available phone numbers in a number pool is acquired from the number pool, where there may be one or more number pools. When the quantity of available phone numbers in the number pool is greater than zero, the following step is performed then: allocating, according to the preset number allocation algorithm, a corresponding IP phone number to the IP phone terminal corresponding to the IP phone terminal identifier information.

If the authentication of the IP phone terminal by the SIP server succeeds, the SIP server allocates, according to the preset number allocation algorithm, the corresponding IP phone number to the IP phone terminal corresponding to the IP phone terminal identifier information. The preset number allocation algorithm includes one or a combination of multiple of: allocation according to a number segment specified by a user, allocation according to a geographic location of a region in which the IP phone terminal is located, and random allocation. Optionally, the automatic number negotiation request packet may carry a request of a user for number allocation, for example, allocation according to a number segment specified by the user, a request for allocating multiple IP phone numbers, number allocation according to a geographic location of a region, or the like. Further optionally, when the IP phone terminal identifier information is a geographic region code, information about the geographic location of the region in which the IP phone terminal is located can be read from the IP phone terminal identifier information, so that an IP phone number can be allocated according to the geographic location of the region accordingly.

Further optionally, the preset number allocation algorithm may further include:

Policy 1: Disable automatic number allocation, and reject an automatic number negotiation request. That is, when receiving the automatic number negotiation request packet sent by the IP phone terminal, the SIP server rejects the request, and returns an error code to the IP phone terminal.

Policy 2: Allocate a unique IP phone number to each IP phone terminal, where number resources may be divided into multiple number pools as required, and a quantity of available phone numbers in each number pool is configurable.

Policy 3: Allocate multiple IP phone numbers to each IP phone terminal, where each IP phone number can belong to only one IP phone terminal, and a quantity of IP phone numbers that can be allocated to each IP phone terminal is configurable. For example, an upper limit of the quantity of IP phone numbers that can be allocated to each IP phone terminal may be set to 20.

Policy 4: Bind each IP phone terminal with one user, one user may be bound with one or more IP phone terminals, and one or more IP phone numbers may be allocated to each IP phone terminal.

Further optionally, after the allocating, by the SIP server according to a preset number allocation algorithm, a corresponding IP phone number to the IP phone terminal corresponding to the IP phone terminal identifier information, the method may further include:

establishing, by the SIP server, a mapping relationship between the allocated IP phone number and the IP phone terminal identifier information. In a specific implementation, after the IP phone number corresponding to the IP phone terminal is generated according to the preset number allocation algorithm, a mapping relationship is established between the generated IP phone number and the IP phone terminal identifier information. That a mapping relationship is established between the generated IP phone number and the IP phone terminal identifier information may include: one piece of IP phone terminal identifier information is corresponding to one IP phone number, or one piece of IP phone terminal identifier information is corresponding to multiple IP phone numbers. That is, the mapping relationship between IP phone terminal identifier information and an IP phone number may be one-to-one or one-to-many.

Step S103: Return the allocated IP phone number to the IP phone terminal, so that the IP phone terminal performs a login by using the IP phone number. In a specific implementation, the SIP server sends the allocated IP phone number to the IP phone terminal, where there may be one or more allocated IP phone numbers. After receiving the IP phone number, the IP phone terminal performs a login by using the IP phone number.

Further optionally, the method for allocating a phone number in this embodiment may further include steps:

The SIP server receives a login request sent by the IP phone terminal, where the login request carries the IP phone number.

If verifying that the IP phone number is the IP phone number mapping to the IP phone terminal identifier information of the IP phone terminal, the SIP server returns, to the IP phone terminal, a response indicating a successful login. In a specific implementation, the SIP server verifies the received login request, and if the IP phone number is the IP phone number mapping to the IP phone terminal identifier information of the IP phone terminal, the verification succeeds, and the SIP server returns, to the IP phone, a response indicating a successful login.

In the method for allocating a phone number in this embodiment of the present invention, after receiving an automatic number negotiation request packet sent by an IP phone terminal, an SIP server allocates an IP phone number to the IP phone terminal, so that the IP phone terminal performs an automatic login by using the IP phone number, thereby implementing automatic deployment of an IP phone number. An operation of deploying an IP phone number is simple and convenient, thereby improving efficiency and operability of deploying IP phone numbers for a large quantity of IP phone terminals.

Figure 2:
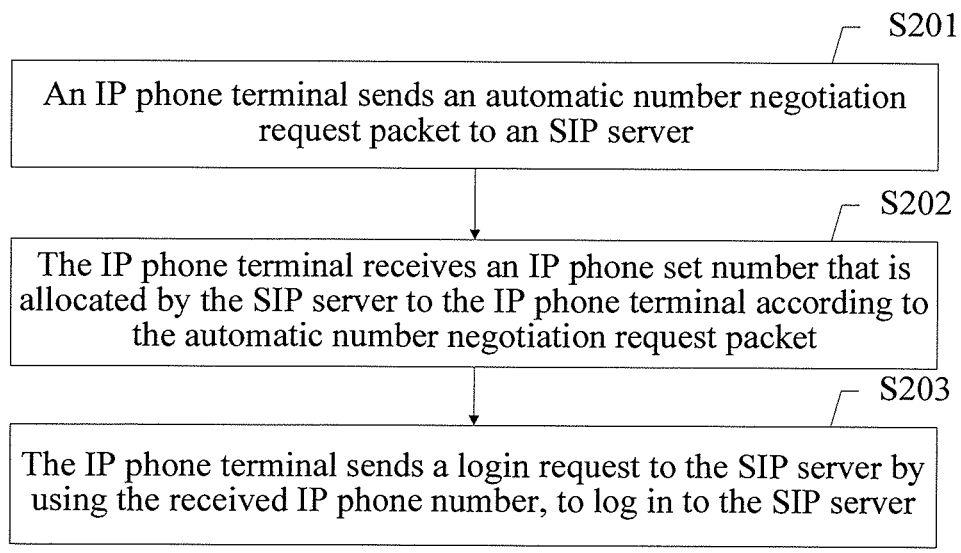
FIG. 2 is a flowchart of a method for allocating a phone number according to another embodiment of the present invention.

FIG. 2 is a flowchart of a method for allocating a phone number according to another embodiment of the present invention. This embodiment of the present invention may be implemented in an IP phone terminal. As shown in the figure, a procedure in this embodiment includes the following steps:

Step S201: An IP phone terminal sends an automatic number negotiation request packet to an SIP server. In a specific implementation, after acquiring an IP phone configuration file and an IP phone release file, the IP phone terminal detects that an address of the SIP server exists in the IP phone configuration file, and when detecting that an automatic registration procedure is enabled, the IP phone terminal sends the automatic number negotiation request packet to the SIP server, where the automatic number negotiation request packet carries an automatic number negotiation request identifier. Therefore, the SIP server identifies the received request packet as the automatic number negotiation request packet according to the automatic number negotiation request identifier. For example, the automatic number negotiation request identifier may be carried by using a From header field.

Step S202: The IP phone terminal receives an IP phone number that is allocated by the SIP server to the IP phone terminal according to the automatic number negotiation request packet. In a specific implementation, the IP phone terminal receives the IP phone number that is allocated by the SIP server to the IP phone terminal according to the automatic number negotiation request packet.

Step S203: The IP phone terminal sends a login request to the SIP server by using the received IP phone number, to log in to the SIP server. In a specific implementation, the IP phone terminal sends a login request to the SIP server by using the received IP phone number, to log in to the SIP server. Then the IP phone performs an automatic login successfully, so that a user can use an IP call service by using the IP phone terminal, such as dialing an IP phone, calling back, or a mailbox.

In the method for allocating a phone number in this embodiment of the present invention, an IP phone terminal sends an automatic number negotiation request packet to an SIP server, the SIP server allocates an IP phone number to the IP phone terminal, and the IP phone terminal performs an automatic login after receiving the IP phone number, thereby implementing automatic deployment of an IP phone number, and improving efficiency and operability of deploying IP phone numbers for a large quantity of IP phone terminals.

Figure 3:
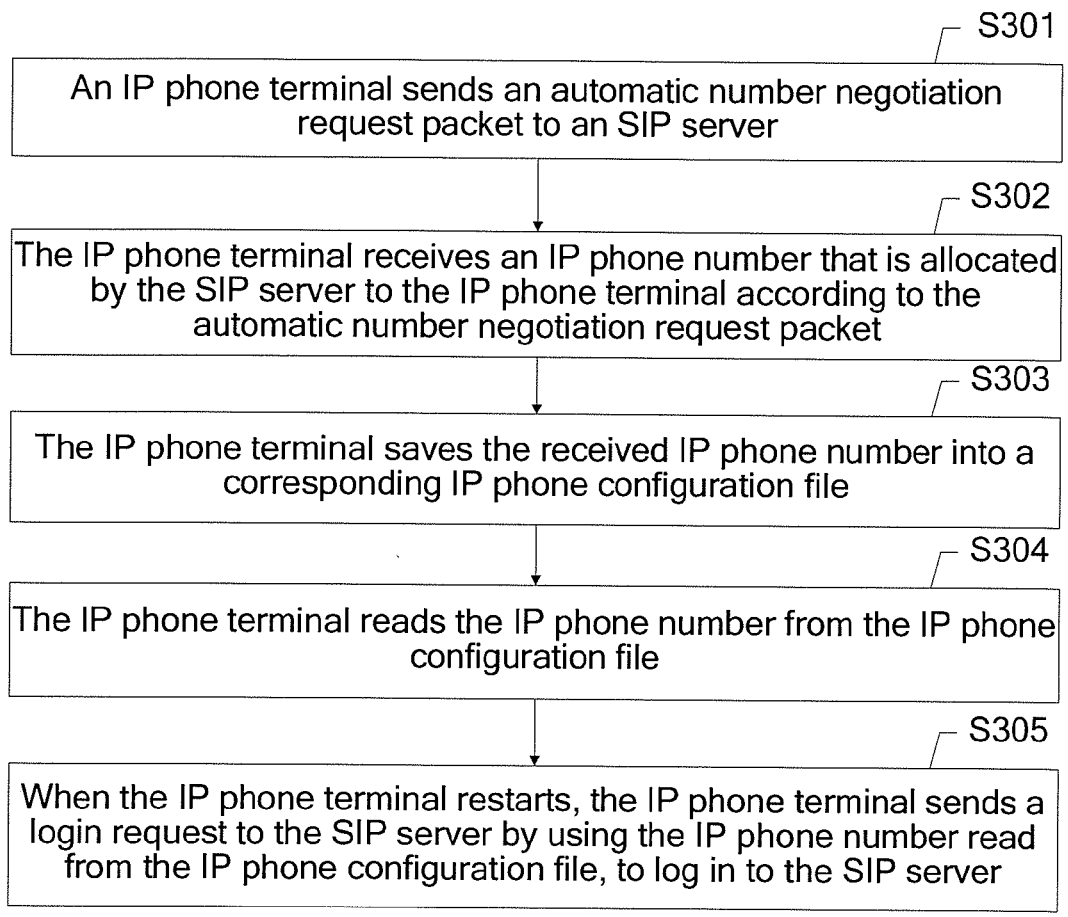
FIG. 3 is a flowchart of a method for allocating a phone number according to still another embodiment of the present invention.

FIG. 3 is a flowchart of a method for allocating a phone number according to still another embodiment of the present invention. This embodiment of the present invention may be implemented in an IP phone terminal. As shown in the figure, a procedure in this embodiment includes the following steps:

Step S301: An IP phone terminal sends an automatic number negotiation request packet to an SIP server.

Step S302: The IP phone terminal receives an IP phone number that is allocated by the SIP server to the IP phone terminal according to the automatic number negotiation request packet.

Step S303: The IP phone terminal saves the received IP phone number into a corresponding IP phone configuration file.

Step S304: The IP phone terminal reads the IP phone number from the IP phone configuration file. In a specific implementation, after step S303, the IP phone terminal reads the IP phone number from the IP phone configuration file, that is, reads the IP phone configuration file to acquire the allocated IP phone number.

Step S305: When the IP phone terminal restarts, the IP phone terminal sends a login request to the SIP server by using the IP phone number read from the IP phone configuration file, to log in to the SIP server. In a specific implementation, when the IP phone terminal restarts, the IP phone terminal automatically sends a login request to the SIP server, where the login request carries the IP phone number, and the IP phone number is read from the IP phone configuration file, that is, the IP phone terminal sends the login request by using the allocated IP phone number, and the IP phone restarts, thereby ensuring that the IP phone number is not lost. For example, two IP phone numbers, namely, an IP phone number A and an IP phone number B are allocated to the IP phone terminal. After a user logs out of the IP phone number A, the IP phone marks the IP phone number A as being logged out of. When the IP phone terminal restarts, the IP phone terminal no longer performs an automatic login by using the IP phone number A, but performs an automatic login by using the IP phone number B that is not logged out of. Further optionally, when the IP phone terminal uses an extension mobility service, and when an IP phone extension phone number is logged out, the IP phone terminal performs an automatic login by using an originally allocated IP phone number, for example, an IP phone terminal C corresponds to an allocated IP phone number C, and when an extension mobility service is used, the user logs out of the IP phone number C, and enters a new IP phone number D to perform a login. When the user logs out of the IP phone number D, the IP phone terminal performs an automatic login by using the IP phone number C.

Further optionally, when a factory setting value of the IP phone terminal is restored, restoring a factory setting value of the IP phone is restoring the IP phone terminal to a default state after delivery, and the IP phone configuration file is of default configuration. After the IP phone terminal sends an automatic number negotiation request to the SIP server, the SIP server returns the previously allocated IP phone number to the IP phone terminal again, the IP phone terminal may resend the login request to the SIP server by using the received IP phone number, to log in to the SIP server. Optionally, the IP phone terminal may further save the received IP phone number into the IP phone configuration file again, the IP phone terminal reads the IP phone number in the IP phone configuration file, and sends the login request to the SIP server by using the IP phone number. When receiving a response that indicates a successful login and is returned by the SIP server, the IP phone terminal performs an automatic login successfully.

In the method for allocating a phone number in this embodiment of the present invention, an IP phone terminal sends an automatic number negotiation request packet to an SIP server, the SIP server allocates an IP phone number to the IP phone terminal, and the IP phone terminal performs an automatic login after receiving the IP phone number. When the IP phone terminal restarts, the IP phone terminal can still perform the automatic login by using an originally allocated IP phone number, thereby implementing automatic deployment of an IP phone number, and improving efficiency and operability of deploying IP phone numbers for a large quantity of IP phone terminals.

Figure 4:
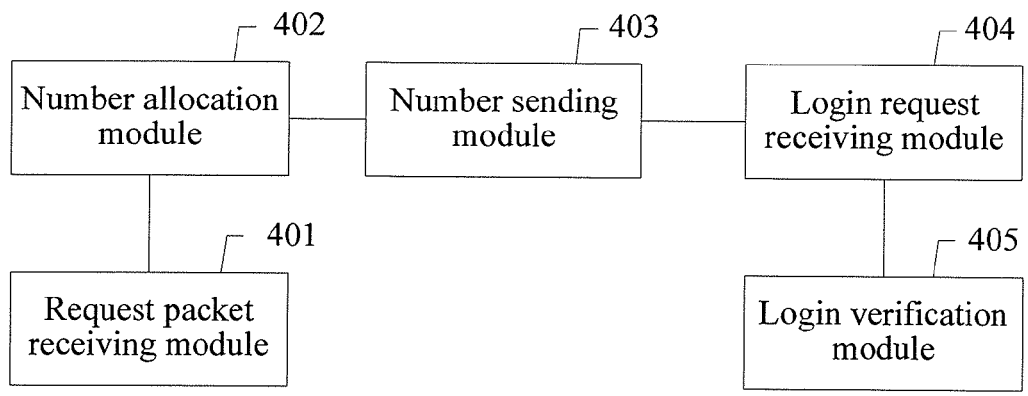
FIG. 4 is a schematic structural diagram of an apparatus for allocating a phone number according to an embodiment of the present invention.

FIG. 4 is a schematic structural diagram of an apparatus for allocating a phone number according to an embodiment of the present invention. The apparatus for allocating a phone number in this embodiment of the present invention may be an SIP server. As shown in the figure, the apparatus for allocating a phone number in this embodiment of the present invention may at least include: a request packet receiving module 401, a number allocation module 402, and a number sending module 403.

The request packet receiving module 401 is configured to receive an automatic number negotiation request packet sent by an IP phone terminal. In a specific implementation, after the IP phone terminal acquires an IP phone configuration file and an IP phone release file, the IP phone terminal detects whether an address of the SIP server exists in the IP phone configuration file, and if the address of the SIP server exists in the IP phone configuration file, the IP phone terminal detects whether an automatic registration procedure is enabled, and if the automatic registration procedure is enabled, the IP phone terminal sends an automatic number negotiation request packet to the SIP server, where the automatic number negotiation request packet carries an automatic number negotiation request identifier, for example, the automatic number negotiation request identifier may be carried by using a From header field, and a specific statement is "From: <sip:Auto_Register@test.com>;tag=469908647". The SIP server identifies the received request packet as an automatic number negotiation request packet according to the automatic number negotiation request identifier.

The number allocation module 402 is configured to allocate a corresponding IP phone number to the IP phone terminal according to the automatic number negotiation request packet received by the request packet receiving module 401, and transmit the IP phone number to the number sending module 403.

Figure 5:
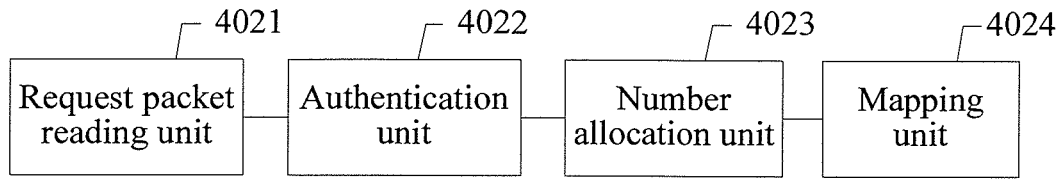
FIG. 5 is a schematic structural diagram of a number allocation module according to an embodiment of the present invention.

Further optionally, FIG. 5 is a schematic structural diagram of a number allocation module according to an embodiment of the present invention. As shown in FIG. 5, the number allocation module 402 may include: a request packet reading unit 4021, an authentication unit 4022, a number allocation unit 4023, and a mapping unit 4024.

The request packet reading unit 4021 is configured to read the automatic number negotiation request packet received by the request packet receiving module 401, where the automatic number negotiation request packet includes: IP phone terminal identifier information and IP phone terminal authentication information. Specifically, IP phone terminal identifier information is a unique identifier corresponding to each IP phone terminal, which may be a device number, a geographic region code, or the like. The IP phone terminal authentication information includes but is not limited to an authentication certificate.

The authentication unit 4022 is configured to authenticate the IP phone terminal according to the IP phone terminal authentication information read by the request packet reading unit 4021. Specifically, after reading the IP phone terminal authentication information carried in the automatic number negotiation request packet, the SIP server authenticates the IP phone terminal, and the SIP server exchanges certificates with the IP phone terminal, that is, two-way authentication is performed. In this way, authentication of the IP phone terminal by the SIP server and authentication of the SIP server by the IP phone terminal are completed.

The number allocation unit 4023 is configured to: when the authentication by the authentication unit 4022 succeeds, allocate, according to a preset number allocation algorithm, a corresponding IP phone number to the IP phone terminal corresponding to the IP phone terminal identifier information. Specifically, when the IP phone terminal is identified, according to the IP phone terminal identifier information, as a device to which no number has been allocated, a quantity of currently available phone numbers in a number pool is acquired from the number pool, where there may be one or more number pools. When the quantity of available phone numbers in the number pool is greater than zero, the following step is performed then: allocating, according to the preset number allocation algorithm, a corresponding IP phone number to the IP phone terminal corresponding to the IP phone terminal identifier information.

If the authentication of the IP phone terminal by the SIP server succeeds, the SIP server allocates, according to the preset number allocation algorithm, the corresponding IP phone number to the IP phone terminal corresponding to the IP phone terminal identifier information. The preset number allocation algorithm includes one or a combination of multiple of: allocation according to a number segment specified by a user, allocation according to a geographic location of a region in which the IP phone terminal is located, and random allocation. Optionally, the automatic number negotiation request packet may carry a request of a user for number allocation, for example, allocation according to a number segment specified by the user, a request for allocating multiple IP phone numbers, number allocation according to a geographic location of a region, or the like. Further optionally, when the IP phone terminal identifier information is a geographic region code, information about the geographic location of the region in which the IP phone terminal is located can be read from the IP phone terminal identifier information, so that an IP phone number can be allocated according to the geographic location of the region accordingly.

Further optionally, the preset number allocation algorithm may further include:

Policy 1: Disable automatic number allocation, and reject an automatic number negotiation request. That is, when receiving the automatic number negotiation request packet sent by the IP phone terminal, the SIP server rejects the request, and returns an error code to the IP phone terminal.

Policy 2: Allocate a unique IP phone number to each IP phone terminal, where number resources may be divided into multiple number pools as required, and a quantity of available phone numbers in each number pool is configurable.

Policy 3: Allocate multiple IP phone numbers to each IP phone terminal, where each IP phone number can belong to only one IP phone terminal, and a quantity of IP phone numbers that can be allocated to each IP phone terminal is configurable. For example, an upper limit of the quantity of IP phone numbers that can be allocated to each IP phone terminal may be set to 20.

Policy 4: Bind each IP phone terminal with one user, one user may be bound with one or more IP phone terminals, and one or more IP phone numbers may be allocated to each IP phone terminal.

The mapping unit 4024 is configured to establish a mapping relationship between the IP phone number allocated by the number allocation unit 4023 and the IP phone terminal identifier information. Specifically, that the mapping unit 4024 establishes a mapping relationship between the allocated IP phone number and the IP phone terminal identifier information specifically includes: one piece of IP phone terminal identifier information is corresponding to one IP phone number, or one piece of IP phone terminal identifier information is corresponding to multiple IP phone numbers. That is, the mapping relationship between IP phone terminal identifier information and an IP phone number may be one-to-one or one-to-many.

The number sending module 403 is configured to return, to the IP phone terminal, the IP phone number allocated by the number allocation module 402, so that the IP phone terminal performs a login by using the IP phone number. In a specific implementation, the SIP server sends the allocated IP phone number to the IP phone terminal, where there may be one or more allocated IP phone numbers. After receiving the IP phone number, the IP phone terminal performs a login by using the IP phone number.

Further optionally, the apparatus for allocating a phone number in this embodiment may further include:

a login request receiving module 404, configured to receive a login request sent by the IP phone terminal, where the login request carries the IP phone number; and a login verification module 405, configured to: if verifying that the IP phone number is the IP phone number mapping to the IP phone terminal identifier information of the IP phone terminal, return, to the IP phone terminal, a response indicating a successful login, where in a specific implementation, the SIP server verifies a request for an automatic login, and if the IP phone number is the IP phone number mapping to the IP phone terminal identifier information of the IP phone terminal, the verification succeeds, and the SIP server returns, to the IP phone, a response indicating a successful login.

The apparatus for allocating a phone number in this embodiment of the present invention may be an SIP server. After receiving an automatic number negotiation request packet sent by an IP phone terminal, the SIP server allocates an IP phone number to the IP phone terminal, so that the IP phone terminal performs an automatic login by using the IP phone number, thereby implementing automatic deployment of an IP phone number. An operation of deploying an IP phone number is simple and convenient, thereby improving efficiency and operability of deploying IP phone numbers for a large quantity of IP phone terminals.

Figure 6:
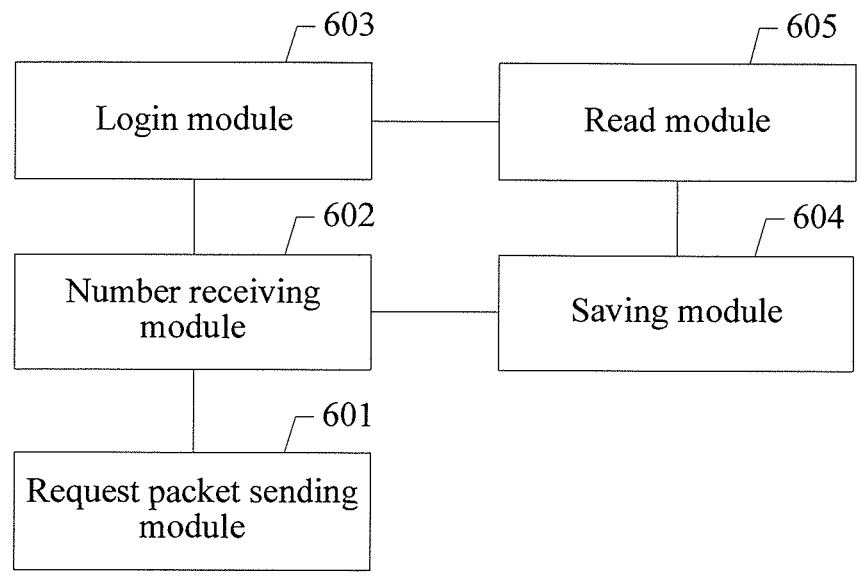
FIG. 6 is a schematic structural diagram of an apparatus for allocating a phone number according to another embodiment of the present invention.

FIG. 6 is a schematic structural diagram of an apparatus for allocating a phone number according to another embodiment of the present invention. The apparatus for allocating a phone number in this embodiment of the present invention may be an IP phone terminal. As shown in the figure, the apparatus for allocating a phone number in this embodiment of the present invention may at least include: a request packet sending module 601, a number receiving module 602, and a login module 603.

The request packet sending module 601 is configured to send an automatic number negotiation request packet to an SIP server. In a specific implementation, after acquiring an IP phone configuration file and an IP phone release file, the IP phone terminal detects that an address of the SIP server exists in the IP phone configuration file, and when detecting that an automatic registration procedure is enabled, the IP phone terminal sends the automatic number negotiation request packet to the SIP server, where the automatic number negotiation request packet carries an automatic number negotiation request identifier. Therefore, the SIP server identifies the received request packet as the automatic number negotiation request packet according to the automatic number negotiation request identifier. For example, the automatic number negotiation request identifier may be carried by using a From header field.

The number receiving module 602 is configured to receive an IP phone number that is allocated by the SIP server to the IP phone terminal according to the received automatic number negotiation request packet sent by the request packet sending module 601, and transmit the IP phone number to the login module 603. In a specific implementation, the IP phone terminal receives the IP phone number that is allocated by the SIP server to the IP phone terminal according to the received automatic number negotiation request packet.

The login module 603 is configured to receive the IP phone number from the number receiving module 602, and send a login request to the SIP server by using the IP phone number, to log in to the SIP server. In a specific implementation, the login module 603 sends a login request to the SIP server by using the received IP phone number, to log in to the SIP server. Then the IP phone performs an automatic login successfully, so that a user can use an IP call service by using the IP phone terminal, such as dialing an IP phone, calling back, or a mailbox.

Further optionally, the apparatus for allocating a phone number in this embodiment may further include:

a saving module 604, configured to save the IP phone number received by the number receiving module 602 into a corresponding IP phone configuration file, where in a specific implementation, the IP phone terminal writes the received IP phone number into the IP phone configuration file; and a read module 605, configured to read the IP phone number from the IP phone configuration file saved by the saving module 604, where in a specific implementation, the IP phone terminal reads the IP phone number from the IP phone configuration file, that is, reads the IP phone configuration file to acquire the allocated IP phone number.

Further optionally, the login module 603 is further configured to: when the IP phone terminal restarts, send a login request to the SIP server by using the IP phone number read by the read module 605 from the IP phone configuration file, to log in to the SIP server. When the IP phone terminal restarts, the IP phone terminal sends a login request to the SIP server, where the login request carries the IP phone number, and the IP phone number is read from the IP phone configuration file, that is, the IP phone terminal sends the login request by using the allocated IP phone number, and the IP phone restarts, thereby ensuring that the IP phone number is not lost. For example, two IP phone numbers, namely, an IP phone number A and an IP phone number B are allocated to the IP phone terminal. After a user logs out of the IP phone number A, the IP phone marks the IP phone number A as being logged out of. When the IP phone terminal restarts, the IP phone terminal no longer performs an automatic login by using the IP phone number A, but performs an automatic login by using the IP phone number B that is not logged out of. Further optionally, when the IP phone terminal uses an extension mobility service, and when an IP phone extension phone number is logged out, the IP phone terminal performs an automatic login by using an originally allocated IP phone number, for example, an IP phone terminal C corresponds to an allocated IP phone number C, and when an extension mobility service is used, the user logs out of an IP phone number C, and enters a new IP phone number D to perform a login. When the user logs out of the IP phone number D, the IP phone terminal performs an automatic login by using the IP phone number C.

Further optionally, when a factory setting value of the IP phone terminal is restored, restoring a factory setting value of the IP phone is restoring the IP phone terminal to a default state after delivery, and the IP phone configuration file is of default configuration. After the IP phone terminal sends an automatic number negotiation request to the SIP server, the SIP server returns the previously allocated IP phone number to the IP phone terminal again, the IP phone terminal may resend the login request to the SIP server by using the received IP phone number, to log in to the SIP server. Optionally, the IP phone terminal may further save the received IP phone number into the IP phone configuration file again, the IP phone terminal reads the IP phone number in the IP phone configuration file, and automatically sends the login request to the SIP server by using the IP phone number. When receiving a response that indicates a successful login and is returned by the SIP server, the IP phone terminal performs an automatic login successfully.

An apparatus for allocating a phone number in this embodiment of the present invention may be implemented in an IP phone terminal, where the IP phone terminal sends an automatic number negotiation request packet to an SIP server, the SIP server allocates an IP phone number to the IP phone terminal, and the IP phone terminal performs an automatic login after receiving the IP phone number. When the IP phone terminal restarts, the IP phone terminal can still perform the automatic login by using an originally allocated IP phone number, thereby implementing automatic deployment of an IP phone number, and improving efficiency and operability of deploying IP phone numbers for a large quantity of IP phone terminals.

Further optionally, the system for allocating a phone number in an embodiment of the present invention includes: an IP phone terminal 1 and an SIP server 2, where:

the SIP server 2 is the apparatus according to FIG. 4 to FIG. 5; and the IP phone terminal 1 is the apparatus according to FIG. 6.

Figure 7:
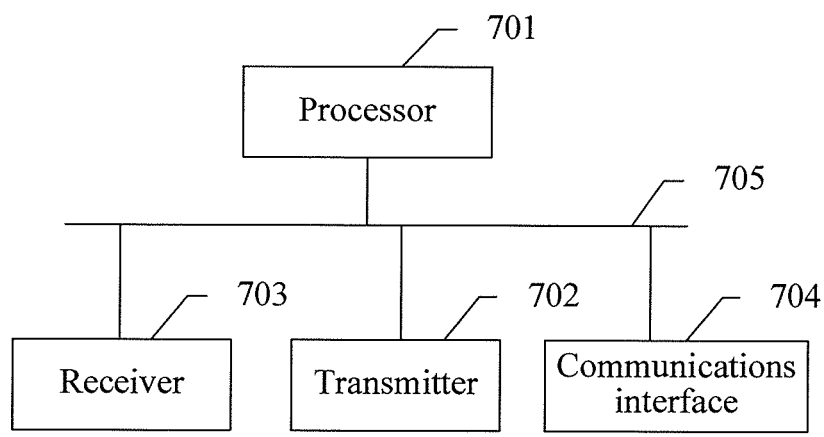
FIG. 7 is a schematic structural diagram of an SIP server according to an embodiment of the present invention.

FIG. 7 is a schematic structural diagram of an SIP server according to an embodiment of the present invention. The method shown in FIG. 1 can be implemented in the SIP server. The SIP server in this embodiment may include: a processor 701, a transmitter 702, and a receiver 703, where:

the receiver 703 is connected to the processor 701, and is configured to receive an automatic number negotiation request packet sent by an IP phone terminal;

the processor 701 is connected to the transmitter 702, and is configured to allocate a corresponding IP phone number to the IP phone terminal according to the received automatic number negotiation request packet; and the transmitter 702 is configured to return the allocated IP phone number to the IP phone terminal.

Optionally, the allocating, by the processor 701, a corresponding IP phone number to the IP phone terminal according to the received automatic number negotiation request packet specifically includes:

reading the received automatic number negotiation request packet, where the automatic number negotiation request packet includes: IP phone terminal identifier information and IP phone terminal authentication information;

authenticating the IP phone terminal according to the read IP phone terminal authentication information; and if the authentication succeeds, allocating, according to a preset number allocation algorithm, a corresponding IP phone number to the IP phone terminal corresponding to the IP phone terminal identifier information.

A mapping relationship is established between the allocated IP phone number and the IP phone terminal identifier information.

Optionally, the receiver 703 is further configured to receive a login request sent by the IP phone terminal, where the login request carries the IP phone number.

Optionally, the transmitter 702 is further configured to: if it is verified that the IP phone number is the IP phone number mapping to the IP phone terminal identifier information of the IP phone terminal, return, to the IP phone terminal, a response indicating a successful login.

Further optionally, the SIP server in this embodiment of the present invention may further include a communications interface 704, configured to communicate with a peripheral device, for example, the IP phone terminal. The SIP server in this embodiment may include a bus 705. The processor 701, the transmitter 702, and the receiver 703 may be connected to and communicate with the communications interface 704 by using the bus 705. The processor 701 may be a central processing unit (central processing unit, CPU), an application-specific integrated circuit (application-specific integrated circuit, ASIC), or the like.

The SIP server in this embodiment of the present invention can allocate an IP phone number to an IP phone terminal after receiving an automatic number negotiation request packet sent by the IP phone terminal, so that the IP phone terminal performs an automatic login by using the IP phone number, thereby implementing automatic deployment of an IP phone number, and improving efficiency and operability of deploying IP phone numbers for a large quantity of IP phone terminals.

Figure 8:
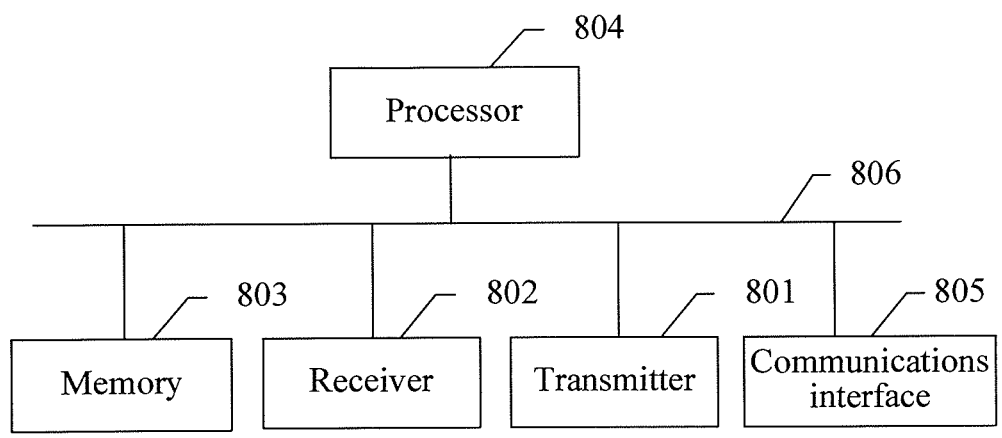
FIG. 8 is a schematic structural diagram of an IP phone terminal according to an embodiment of the present invention.

FIG. 8 is a schematic structural diagram of an IP phone terminal according to an embodiment of the present invention, and the methods shown in FIG. 2 and FIG. 3 can be implemented in the IP phone terminal. The IP phone terminal in this embodiment may include: a transmitter 801, a receiver 802, a memory 803, and a processor 804, where:

the transmitter 801 is configured to send an automatic number negotiation request packet to an SIP server;

the receiver 802 is connected to the processor 804, and is configured to receive an IP phone number that is allocated by the SIP server to the IP phone terminal according to the automatic number negotiation request packet;

the memory 803 is connected to the processor 804, and is configured to save the received IP phone number into a corresponding IP phone configuration file; and the processor 804 is connected to the transmitter 801, and is configured to read the IP phone number from the IP phone configuration file.

Optionally, the transmitter 801 is further configured to: when the IP phone terminal restarts, send, by the IP phone terminal, a login request to the SIP server by using the IP phone number read from the IP phone configuration file, to log in to the SIP server.

Further optionally, the IP phone terminal in this embodiment of the present invention may further include a communications interface 805, configured to communicate with a peripheral device, for example, the SIP server. The IP phone terminal in this embodiment may further include a bus 806. The transmitter 801, the receiver 802, the memory 803, and the processor 804 may be connected to and communicate with the communications interface 805 by using the bus 806. The memory 803 may include an entity that has a storage function, such as a random access memory (random access memory, RAM) or a read-only memory (read-only memory, ROM).

The IP phone terminal in this embodiment of the present invention can send, to an SIP server, an automatic number negotiation request packet and a request for an automatic login. When the IP phone terminal restarts, the IP phone terminal can still perform an automatic login by using an originally allocated IP phone number, thereby implementing automatic deployment of an IP phone number, and improving efficiency and operability of deploying IP phone numbers for a large quantity of IP phone terminals.

Based on the description of the foregoing implementation manner, a person skilled in the art may clearly understand that the present invention may be implemented by hardware, firmware, or a combination of both. When the present invention is implemented by software, the foregoing functions may be stored in a computer-readable medium or may be transmitted as one or more instructions or codes on the computer-readable medium. The computer readable media includes both a computer storage medium and a communication medium, where the communication medium includes any medium that facilitates transferring of a computer program from one location to another. The storage medium may be any available medium that a computer can access. Examples of the computer-readable medium include but are not limited to: a RAM, a ROM, an EEPROM, a CD-ROM, or other optical disk storage media or disk storage media or other magnetic storage devices, or any other computer-accessible medium that can be used to carry or store expected program code in an instruction form or in a data structure form. In addition, any connection may function as a computer readable medium properly. For example, if the software is transmitted from a website, a server, or other remote sources by using a coaxial cable, an optical fiber cable, a twisted pair, a digital subscriber line (DSL), or a radio technology such as infrared, radio, and microwave, the coaxial cable, optical fiber cable, twisted pair, DSL, or the radio technology such as infrared, radio, and microwave are included in fixation of a medium to which they belong. As used in the present invention, a disk (Disk) and a disc (disc) include a compact disc (CD), a laser disc, an optical disc, a digital versatile disc (DVD), a floppy disk, and a Blu-ray disc, where the disk is usually used to replicate data magnetically, and the disc uses laser to replicate data optically by using laser. A combination of the foregoing shall also fall within the protection scope of the computer readable medium.

What is disclosed above is merely exemplary embodiments of the present invention. However, the protection scope of the present invention is not limited thereto. Therefore, equivalent variations made according to the claims of the present invention shall fall within the scope of the present invention.

What is claimed is:

1. A method for allocating a phone number, the method comprising:
    receiving, by a Session Initiation Protocol (SIP) server, an automatic number negotiation request packet sent by an Internet Protocol IP phone terminal;
    allocating, by the SIP server, a corresponding IP phone number to the IP phone terminal according to the received automatic number negotiation request packet, by:
        reading, by the SIP server, the received automatic number negotiation request packet, wherein the automatic number negotiation request packet comprises: the IP phone terminal identifier information and IP phone terminal authentication information;
        authenticating, by the SIP server, the IP phone terminal according to the IP phone terminal authentication information read from the automatic number negotiation request packet; and
        allocating, by the SIP server according to a preset number allocation algorithm, a corresponding IP phone number to the IP phone terminal corresponding to IP phone terminal identifier information, when the authentication succeeds;
    establishing, by the SIP server, a mapping relationship between the allocated IP phone number and the IP phone terminal identifier information of the IP phone terminal;
    returning, by the SIP server, the allocated IP phone number to the IP phone terminal;
    receiving, by the SIP server, a login request sent by the IP phone terminal, wherein the login request carries the IP phone number; and
    returning, to the IP phone terminal, a response indicating a successful login, after the SIP server verifies that the IP phone number corresponds to the IP phone terminal identifier information according to the mapping relationship.

2. The method according to claim 1, wherein
    the IP phone terminal acquires the IP phone terminal identifier information using Dynamic Host Configuration Protocol.

3. The method according to claim 1, wherein the preset number allocation algorithm comprises one or a combination of the following: allocation according to a number segment specified by a user, or allocation according to a geographic location of a region in which the IP phone terminal is located.

4. The method according to claim 1, wherein
    the IP phone terminal identifier information is one of a device number or an identifier coded according to geographic region.

5. A method for allocating a phone number, wherein the method comprises:
    sending, by an IP phone terminal, an automatic number negotiation request packet to an SIP server;
    receiving, by the IP phone terminal, an IP phone number that is allocated by the SIP server to the IP phone terminal according to the automatic number negotiation request packet, wherein the IP phone number is allocated by the SIP server by:
        reading the received automatic number negotiation request packet, wherein the automatic number negotiation request packet comprises: the IP phone terminal identifier information and IP phone terminal authentication information;
        authenticating the IP phone terminal according to the IP phone terminal authentication information read from the automatic number negotiation request packet; and
        allocating according to a preset number allocation algorithm, a corresponding IP phone number to the IP phone terminal corresponding to the IP phone terminal identifier information, when the authentication succeeds, wherein the SIP server establishes a mapping relationship between the allocated LP phone number and IP phone terminal identifier information of the IP phone terminal; and
    sending, by the IP phone terminal, a login request to the SIP server that includes the received IP phone number, to log in to the SIP server, wherein the SIP server thereafter verifies that the IP phone number corresponds to the IP phone terminal identifier information according to the mapping relationship and receiving a response indicating a successful login, after the SIP server verifies that the IP phone number corresponds to the IP phone terminal identifier information according to the mapping relationship.

6. The method according to claim 5, wherein after receiving, by the IP phone terminal, an IP phone number that is allocated by the SIP server to the IP phone terminal according to the automatic number negotiation request packet, the method comprises:
saving, by the IP phone terminal, the received IP phone number into a corresponding IP phone configuration file;
reading, by the IP phone terminal, the IP phone number from the IP phone configuration file; and
sending, by the IP phone terminal, a login request to the SIP server by using that includes the IP phone number read from the IP phone configuration file, to log in to the SIP server, when the IP phone terminal restarts.

7. An apparatus for allocating a phone number, the apparatus comprising:
a processor; and
a non-transitory computer readable medium comprising computer-executable instructions for allocating a phone number wherein the processor is configured to execute the computer-executable instructions to perform operations comprising:
receiving an automatic number negotiation request packet sent by an Internet Protocol IP phone terminal;
allocating a corresponding IP phone number to the IP phone terminal according to the received automatic number negotiation request packet by:
reading the received automatic number negotiation request packet, wherein the automatic number negotiation request packet comprises: IP phone terminal identifier information and IP phone terminal authentication information;
authenticating the IP phone terminal according to the IP phone terminal authentication information read from the automatic number negotiation request packet; and
allocating according to a preset number allocation algorithm, a corresponding IP phone number to the IP phone terminal corresponding to the IP phone terminal identifier information, when the authentication succeeds;
establishing a mapping relationship between the allocated IP phone number and the IP phone terminal identifier information; and
returning the allocated IP phone number to the IP phone terminal, so that the IP phone terminal performs a login by using the IP phone number;
receiving a login request sent by the IP phone terminal, wherein the login request carries the IP phone number; and
returning, to the IP phone terminal, a response indicating a successful login, after verifying that the IP phone number corresponds to the IP phone terminal identifier information according to the mapping relationship.

8. The apparatus according to claim 7, wherein
the IP phone terminal acquires the IP phone terminal identifier information using Dynamic Host Configuration Protocol.

9. The apparatus according to claim 8, wherein
the IP phone terminal identifier information is one of a device number or an identifier coded according to geographic region.

10. The apparatus according to claim 7, wherein the preset number allocation algorithm comprises one or a combination of the following: allocation according to a number segment specified by a user, or allocation according to a geographic location of a region in which the IP phone terminal is located.

11. An apparatus for allocating a phone number, the apparatus comprising:
a processor; and
a non-transitory computer readable medium which contains computer-executable instructions for decoding audio data of multiple channels wherein the processor is configured to execute the computer-executable instructions to perform operations comprising:
sending an automatic number negotiation request packet to an SIP server;
receiving an IP phone number that is allocated by the SIP server to the apparatus according to the automatic number negotiation request packet, wherein the IP phone number is allocated by the SIP server by:
reading the received automatic number negotiation request packet, wherein the automatic number negotiation request packet comprises: the IP phone terminal identifier information and IP phone terminal authentication information;
authenticating the IP phone terminal according to the IP phone terminal authentication information read from the automatic number negotiation request packet; and
allocating according to a preset number allocation algorithm, a corresponding IP phone number to the IP phone terminal corresponding to the IP phone terminal identifier information, when the authentication succeeds, wherein the SIP server establishes a mapping relationship between the allocated IP phone number and IP phone terminal identifier information of the IP phone terminal; and
sending a login request to the SIP server by using the received IP phone number, to log in to the SIP server, wherein the SIP server thereafter verifies that the IP phone number corresponds to the IP phone terminal identifier information according to the mapping relationship and receiving a response indicating a successful login, after the SW server verifies that the IP phone number corresponds to the IP phone terminal identifier information according to the mapping relationship.

12. The apparatus according to claim 11, wherein the processor is configured to execute the computer-executable instructions to perform further operations comprising:
saving the received IP phone number into a corresponding IP phone configuration file;
reading the IP phone number from the IP phone configuration file; and
sending a login request to the SIP server by using the IP phone number read from the IP phone configuration file, to log in to the SIP server, when the restarts.

\* \* \* \* \*